US007178126B2

(12) United States Patent
Arai et al.

(10) Patent No.: US 7,178,126 B2
(45) Date of Patent: Feb. 13, 2007

(54) METHOD OF PROTECTING A SEMICONDUCTOR INTEGRATED CIRCUIT FROM PLASMA DAMAGE

(75) Inventors: Kenji Arai, Tokyo (JP); Takayuki Yamamoto, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 334 days.

(21) Appl. No.: 10/760,295

(22) Filed: Jan. 21, 2004

(65) Prior Publication Data

US 2005/0160389 A1 Jul. 21, 2005

(51) Int. Cl.
*G06F 17/50* (2006.01)
*H01L 23/62* (2006.01)

(52) U.S. Cl. .............................. 716/14; 716/1; 716/11; 716/13; 257/355; 257/356; 257/491

(58) Field of Classification Search .................... 716/4, 716/8, 9, 12, 13, 21; 257/48, 173, 344, 355, 257/356, 391; 438/17, 30, 197, 396, 401, 438/689, 728
See application file for complete search history.

(56) References Cited

U.S. PATENT DOCUMENTS

| 5,650,651 | A | * | 7/1997 | Bui ............................ 257/355 |
| 5,717,294 | A | * | 2/1998 | Sakai et al. ............. 315/111.41 |
| 5,760,445 | A | * | 6/1998 | Diaz .......................... 257/356 |
| 5,779,925 | A | * | 7/1998 | Hashimoto et al. ........... 216/67 |
| 5,828,119 | A | * | 10/1998 | Katsube ...................... 257/491 |
| 5,955,764 | A | * | 9/1999 | Katsube ...................... 257/355 |

(Continued)

FOREIGN PATENT DOCUMENTS

JP 11-168196 6/1999

(Continued)

OTHER PUBLICATIONS

Kubo et al., : Evaluation of charge build-up in wafer processing by using MOS capacitors with charge collecting electrodes,□□Mar. 22-25, 1995, Microelectronic Test Structures, ICMTS, Proceedings of the International Conference on, pp. 5-9 □□□□.*

(Continued)

*Primary Examiner*—Jack Chiang
*Assistant Examiner*—Helen Rossoshek
(74) *Attorney, Agent, or Firm*—Nixon Peabody LLP; Donald R. Studebaker

(57) ABSTRACT

In the design of an integrated circuit having a semiconductor substrate and metal interconnecting lines, including a core ring with metal power and ground lines that supply power to a core area inside the core ring, one or more metal-oxide-semiconductor capacitor units are laid out below the core ring. Each unit has an active area and an insulated gate electrode, which are connected by contacts to the core ring. These capacitor units protect transistors in the core area that have gate electrodes connected to the power or ground line from plasma damage during the fabrication of the integrated circuit. Additional capacitor units laid out below the core ring may be connected to a surrounding input-output ring to protect transistors in input-output circuits, and similar units may be connected to the core ring and input-output ring as protection transistors.

4 Claims, 13 Drawing Sheets

U.S. PATENT DOCUMENTS

| | | | |
|---|---|---|---|
| 6,028,324 A * | 2/2000 | Su et al. | 257/48 |
| 6,251,697 B1 * | 6/2001 | Chacon et al. | 438/17 |
| 6,376,388 B1 * | 4/2002 | Hashimoto et al. | 438/728 |
| 6,389,584 B1 * | 5/2002 | Kitahara | 716/13 |
| 6,404,026 B2 * | 6/2002 | Tsuyuki | 257/409 |
| 6,483,737 B2 * | 11/2002 | Takeuchi et al. | 365/145 |
| 6,496,959 B1 * | 12/2002 | Noguchi | 716/4 |
| 6,600,176 B2 * | 7/2003 | Noguchi | 257/173 |
| 6,686,254 B2 * | 2/2004 | Petrucci et al. | 438/401 |
| 6,884,670 B2 * | 4/2005 | Hashimoto et al. | 438/197 |
| 6,978,437 B1 * | 12/2005 | Rittman et al. | 716/21 |
| 2002/0058390 A1 * | 5/2002 | Imai | 438/396 |
| 2003/0139043 A1 * | 7/2003 | Marcus et al. | 438/689 |
| 2004/0195629 A1 * | 10/2004 | Lai et al. | 257/355 |
| 2005/0227397 A1 * | 10/2005 | Kato et al. | 438/30 |

FOREIGN PATENT DOCUMENTS

JP  2004253610 A * 9/2004

OTHER PUBLICATIONS

Shawming et al., "Prediction of plasma charging induced gate oxide damage by plasma charging probe", May 13-14, 1996, Plasma Process-Induced Damage, 1st International Symposium on, pp. 20-23 □□□□.*

* cited by examiner

METHOD OF PROTECTING A SEMICONDUCTOR INTEGRATED CIRCUIT FROM PLASMA DAMAGE

BACKGROUND OF THE INVENTION

1. Field of the Invention

The present invention relates to a semiconductor integrated circuit layout method, more particularly to a method of placing capacitors and transistors to provide protection from plasma damage and electrostatic discharge.

2. Description of the Related Art

Modern semiconductor integrated circuit fabrication processes include many deposition and etching steps involving the use of plasma. A resulting problem is that the electrical charge of the plasma, conducted through metal and other conductive patterns in the integrated circuit, can damage internal parts of the integrated circuit during the fabrication process. Particularly vulnerable to such plasma damage are the thin oxide films that insulate the gate electrodes of transistors from the substrate in which the transistors are formed.

The risk of plasma damage depends on what is referred to as the antenna ratio. For the semiconductor integrated circuit as a whole, the antenna ratio is the ratio of the total area occupied by metal patterns, which act as antennas for receiving plasma charge, to the total area of the gate electrodes, excluding metal patterns not electrically coupled to any gate electrode. For a particular gate electrode, the antenna ratio is the ratio of the total area of the metal patterns electrically coupled to the gate electrode to the total area of the gate electrodes electrically coupled to those metal patterns. A high antenna ratio implies that much charge will be concentrated on the gate electrodes during plasma processing.

Gate electrodes that are connected to the power supply pattern or ground pattern tend to have an especially high antenna ratio, due to the large size of the power and ground patterns. Such gate electrodes are found in transistors used for current limitation. Ironically, such gate electrodes are also found in protection transistors that are intended to protect internal circuitry from electrostatic discharge.

A known method of reducing the risk of plasma damage is to provide additional capacitors to absorb the plasma charge. The problem is where to place the capacitors. Japanese Unexamined Patent Application Publication No. 11-168196 suggests placing capacitors beneath the pads used for external signal connections, or beneath the interconnecting lines leading from these pads to the gate electrodes. This scheme, however, requires a separate capacitor for each gate electrode, and fails to provide capacitors for gate electrodes that do not receive external signals. In particular, it does not adequately protect the gate electrodes of current limiting transistors and protection transistors, which are most vulnerable to plasma damage.

A further problem that afflicts semiconductor integrated circuits is variations in the power supply and ground potentials caused by switching of output signals between the high and low logic levels, especially when a large number of outputs are switched simultaneously. This problem is generally known as ground bounce.

SUMMARY OF THE INVENTION

An object of the present invention is to provide an appropriate method for laying out capacitors to reduce the antenna ratio of a semiconductor integrated circuit.

A more particular object is to reduce the antenna ratio of gate electrodes connected to the power supply or ground.

A further object is to provide a method of increasing the number of protection transistors in a semiconductor integrated circuit.

A still further object is to reduce ground bounce.

The present invention provides a layout method useful in the design of an integrated circuit having a semiconductor substrate and metal interconnecting lines disposed above the substrate. The metal interconnecting lines include a core ring with a mutually adjacent power line and ground line that supply power to circuits in a core area surrounded by the core ring. The invented method lays out one or more metal-oxide-semiconductor (MOS) capacitor units below the core ring. Each MOS capacitor unit has an active area disposed in the substrate and an insulated gate electrode disposed on the substrate, at least partly above the active area. The active area and insulated gate electrode are connected by contacts to the core ring. The active area may be connected to the power line and the insulated gate electrode to the ground line, or the active area may be connected to the ground line and the insulated gate electrode to the power line.

The core ring may be crossed by input-output (I/O) signal lines connecting the circuits in the core area to I/O circuits disposed outside the core ring. The invented method preferably places the MOS capacitor units at points where these I/O signal lines are comparatively sparse.

The I/O circuits may be supplied with power by an I/O ring surrounding the core ring. Some of the MOS capacitor units disposed below the core ring may be connected to the I/O ring, to protect the I/O circuits from plasma damage. These MOS capacitor units may also be laid out between the core ring and the I/O ring.

If the core ring and I/O ring are mutually adjacent, another mode of practicing the invention is available, in which MOS units that may function as either transistors or capacitors are laid out. Each MOS unit includes an active layer extending under the power lines and ground lines in both the core ring and the I/O ring, and an insulated gate electrode paralleling the active area, with branches crossing the active area. The active area and insulated gate electrode can be connected to the core ring and I/O ring in various ways, enabling the MOS unit to function as a MOS capacitor connected to the core ring, a MOS capacitor connected to the I/O ring, or a protection transistor. If connected as a protection transistor, the MOS unit provides protection from electrostatic discharge by shunting surge current between the core ring and I/O ring, for example, or between the power and ground lines in the core ring.

By providing additional capacitance to absorb plasma charge, the invented method protects transistors having gate electrodes connected to the power line or ground line in the core ring or I/O ring from plasma damage, by reducing their antenna ratio, without disrupting the layout or increasing the size of the integrated circuit.

The additional capacitance also reduces ground bounce, particular when MOS capacitors are connected to the I/O ring.

MOS units connected as protection transistors below the core ring and I/O ring also provide a convenient way to increase the ability of the integrated circuit to withstand electrostatic discharge, without disrupting the layout or increasing the size of the integrated circuit.

DETAILED DESCRIPTION OF THE INVENTION

Figure 1:
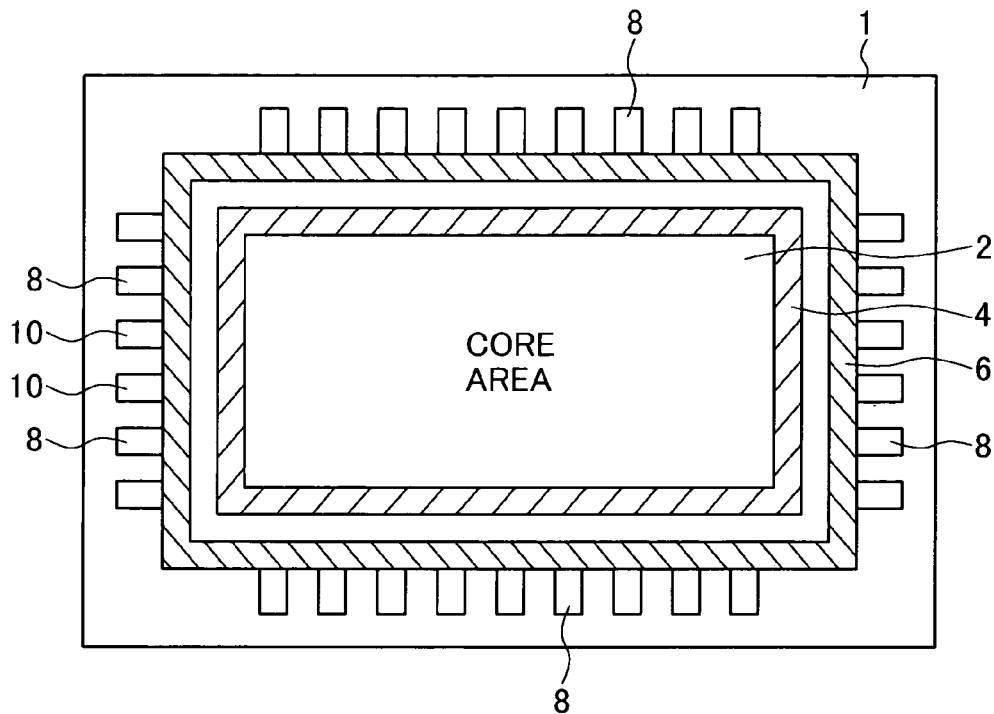
FIG. 1 illustrates the general layout of a semiconductor integrated circuit to which the present invention is applicable.

Embodiments of the invention will now be described with reference to the attached drawings, in which like elements are indicated by like reference characters.

First a general description of the type of semiconductor integrated circuit dealt with in the following embodiments will be given. Referring to the plan view in FIG. 1, the semiconductor integrated circuit 1 comprises a core area 2 including processing circuits, memory circuits, and the like, surrounded by a core ring 4 from which a power supply voltage or power supply potential VDD and a ground voltage or ground potential VSS are supplied to the circuitry in the core area 2. The core ring 4 is surrounded by an I/O ring 6 from which a power supply voltage and ground voltage are supplied to I/O circuits 8 disposed outside the core ring 4, around the periphery of the semiconductor integrated circuit 1. Also disposed outside the core ring 4 are power cells 10 that receive power and ground potentials from an external source (not shown), generate the above voltages VDD and VSS, and supply them to the core ring 4 and I/O ring 6.

Figure 2:
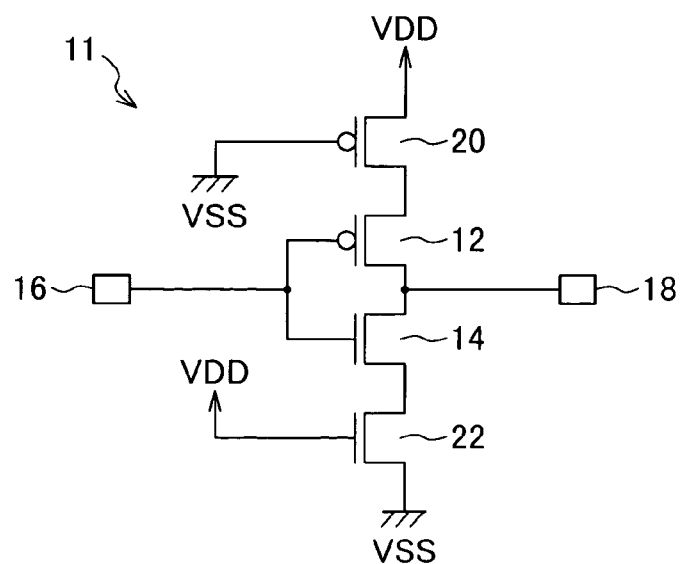
FIG. 2 is a circuit diagram of an inverter with current limiting transistors.

FIG. 2 shows an example of a typical circuit used in the core area of the semiconductor integrated circuit. The circuit is an inverter 11 comprising a p-channel metal-oxide-semiconductor (PMOS) switching transistor 12 and an n-channel metal-oxide-semiconductor (NMOS) switching transistor 14 coupled in series between a node to which VDD is supplied and a node to which VSS is supplied. The gate electrodes of both switching transistors 12, 14 are connected to an input node 16; the drain electrodes of both switching transistors 12, 14 are connected to an output node 18. An additional PMOS transistor 20 connected in series with the PMOS switching transistor 12 has its gate electrode fixed at the VSS potential; an additional NMOS transistor 22 connected in series with the NMOS switching transistor 14 has its gate electrode fixed at the VDD potential. These transistors 20, 22 are always in the conducting state, but they are dimensioned so as to saturate at a comparatively low current level, and thus limit current flow through the inverter 11.

Other logic circuits in the core area of the semiconductor integrated circuit have similar current-limiting transistors inserted at appropriate points. Power consumption in the core area is thereby reduced.

Figure 3:
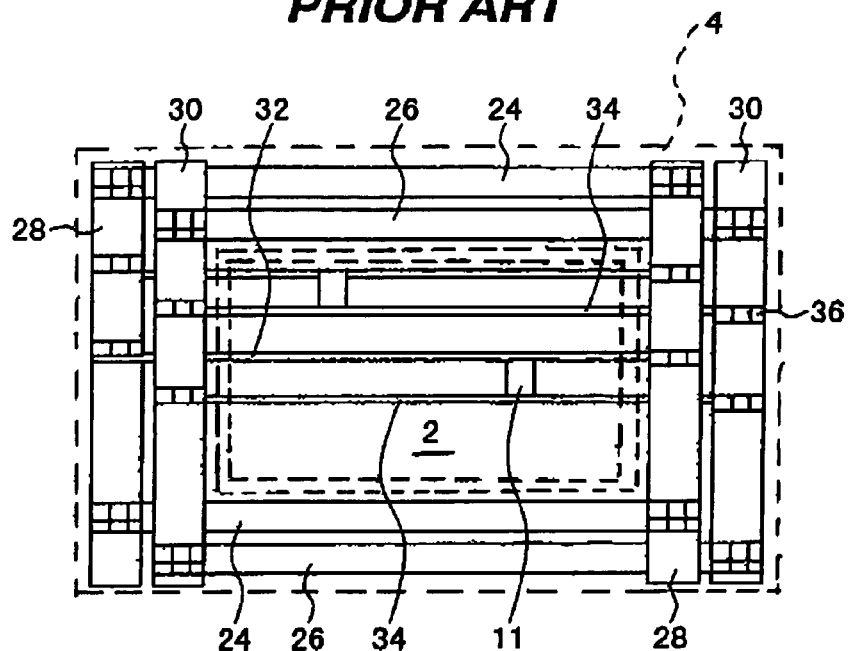
FIG. 3 illustrates the connection of the inverter in FIG. 2 to the core ring in FIG. 1.

FIG. 3 shows in more detail how VDD and VSS are supplied from the core ring 4 to the core area 2. The core ring 4 comprises a pair of VDD lines 24 and a pair of VSS lines 26 disposed in a first metal layer (that is, a first layer of metal interconnection patterns), and a pair of VDD lines 28 and a pair of VSS lines 30 disposed in a second metal layer. A plurality of VDD lines 32 and VSS lines 34 extend across the core area 2 in the first metal layer. The VDD lines 24, 32 in the first metal layer are electrically coupled at their ends to the VDD lines 28 in the second metal layer by contacts. The VSS lines 26, 34 in the first metal layer are similarly coupled to the VSS lines 30 in to second metal layer. Core circuits such as the inverter 11 in FIG. 2 receive power from the VDD lines 32 and VSS lines 34 routed above them in to first metal layer.

Figure 4:
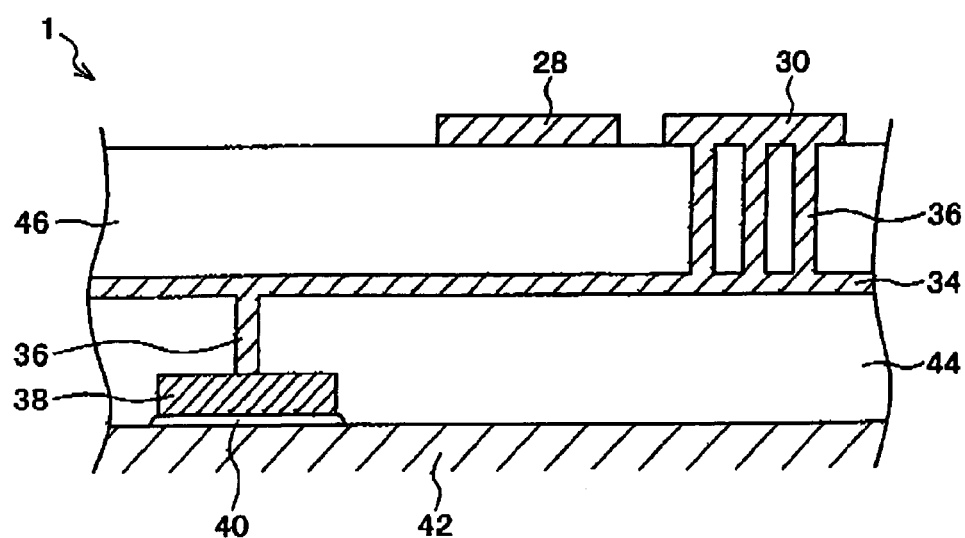
FIG. 4 is a sectional view illustrating the connection of a gate electrode to the core ring.

FIG. 4 is a sectional view schematically illustrating the supply of VSS to, for example, the gate electrode 38 of the current-limiting PMOS transistor 20 in FIG. 2. The gate electrode 38 is a polysilicon electrode insulated by a gate oxide film 40 from the substrate 42 of the semiconductor integrated circuit 1. The first metal layer, including VSS line 34, is insulated from the substrate 42 by a first interlayer dielectric film 44. The second metal layer, including VSS line 30, is insulated from the first metal layer by a second interlayer dielectric film 46. Metallic contacts 36 extend through the interlayer dielectric films 44, 46 at the necessary points.

Figure 5:
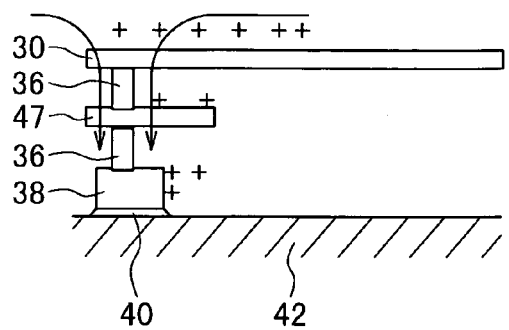
FIG. 5 is a sectional view schematically illustrating the antenna ratio of a gate electrode.
Figure 6:
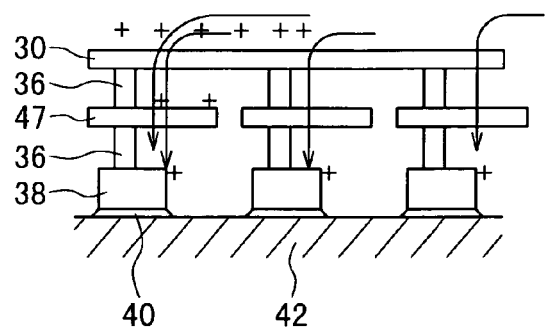
FIG. 6 is a sectional view schematically illustrating a method of reducing the antenna ratio in FIG. 5.

FIG. 5 schematically illustrates the antenna ratio problem, showing how a plasma charge (+) acquired by, for example, VSS line 30 in the second metal layer during a fabrication process can be conducted through the first metal layer 47 and contacts 36 to a polysilicon gate electrode 38, in which enough charge may accumulate to break down or otherwise damage the gate oxide film 40. FIG. 6 schematically illustrates a solution to the problem: if the number of polysilicon gate electrodes electrically connected to VSS line 30 is tripled, the antenna ratio is reduced by a factor of three, so the charge that accumulates on each polysilicon gate electrode 38 is reduced by a factor of three, greatly lessening the risk of plasma damage to the gate oxide films 40.

Figure 7:
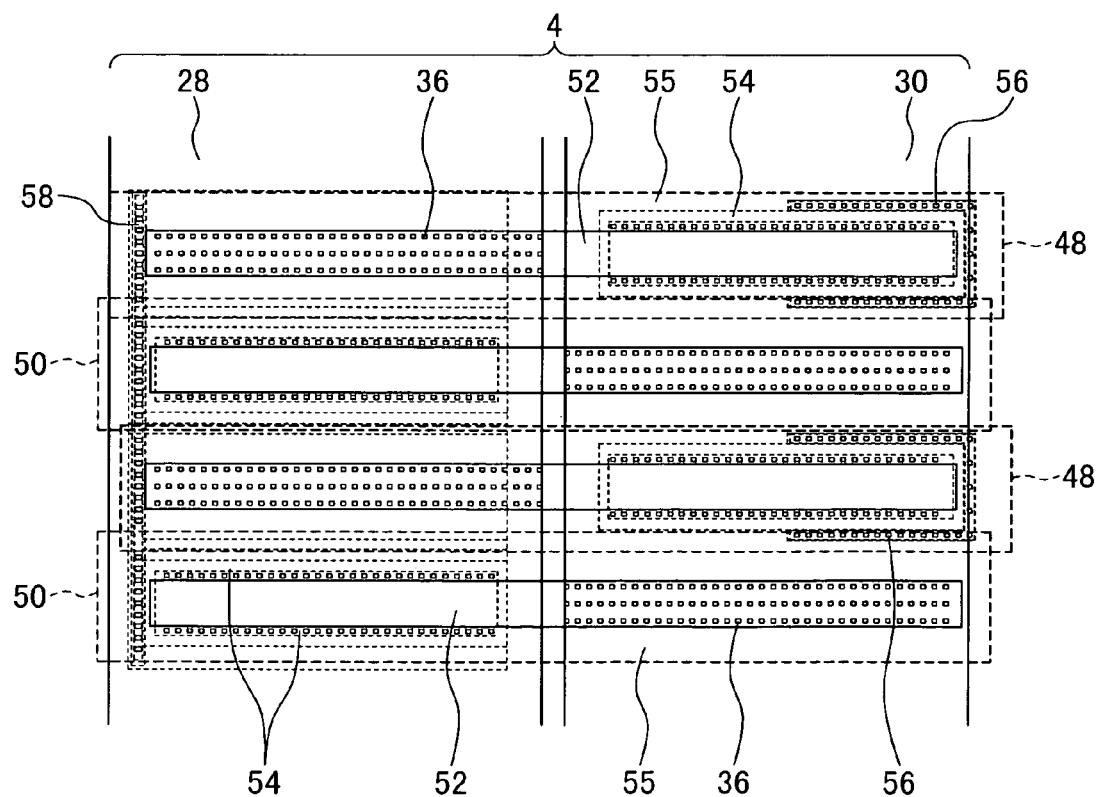
FIG. 7 is a plan view of a MOS capacitor layout illustrating a first embodiment of the invention.

FIG. 7 illustrates a first embodiment of the invention. To reduce the antenna ratio, a plurality of metal-oxide-semiconductor (MOS) capacitor units 48, 50 are laid out beneath the core ring 4. Each MOS capacitor unit is generally similar to a transistor, having a polysilicon gate electrode 52 and an active area 54. The polysilicon gate electrode 52 extends across substantially the full width of the core ring 4; the active area 54 extends across substantially half the width of the core ring 4. For a transistor, the active area 54 would include a source, drain, and channel. The parts of the active area 54 not disposed below the polysilicon gate electrode 52 will also be referred to below as source and drain areas. The MOS capacitor units 48, 50 shown in FIG. 7 are disposed beneath one of the pairs of mutually adjacent core ring lines (VDD and VSS lines) 28, 30 in the second metal layer in FIG. 3. Similar MOS capacitor units may be disposed beneath the mutually adjacent core ring lines 24, 26 in the first metal layer.

The active area 54 is a doped area disposed in the substrate of the semiconductor integrated circuit, and is surrounded by a field oxide 55 formed by, for example, local oxidation of the substrate. The polysilicon gate electrode 52 is disposed on the substrate and is insulated from the substrate by a thin gate oxide film of the type shown in FIGS. 5 and 6. The polysilicon gate electrode 52 is insulated from the metal interconnection layers, including the VDD and VSS lines of the core ring 4, by interlayer dielectric films of the type shown in FIGS. 5 and 6.

In MOS capacitor units 48, also denoted ANT_VDD, the polysilicon gate electrode 52 is electrically connected to the VDD line 28 in the core ring 4 by contacts 36, and the source and drain parts of the active areas 54 are electrically connected to the adjacent VSS line 30 by similar contacts. The active areas 54 are disposed beneath the VSS line 30 and do not extend beneath the VDD line 28. The active areas 54 are partially surrounded by a VSS guard ring 56 that is electrically coupled to the VSS line 30 through contacts to provide protection against electrostatic discharge and latch-up.

In MOS capacitor units 50, also denoted ANT_VSS, the polysilicon gate electrode 52 is electrically connected to the VSS line 30 and the source and drain areas 54 are electrically connected to the adjacent VDD line 28. The active areas 54 are disposed beneath the VDD line 28 and do not extend beneath the VSS line 30. A VDD guard ring 58 parallels the edge of the VDD line 28 and is electrically coupled to the VDD line 28 through contacts to provide protection against electrostatic discharge and latch-up.

Figure 8:
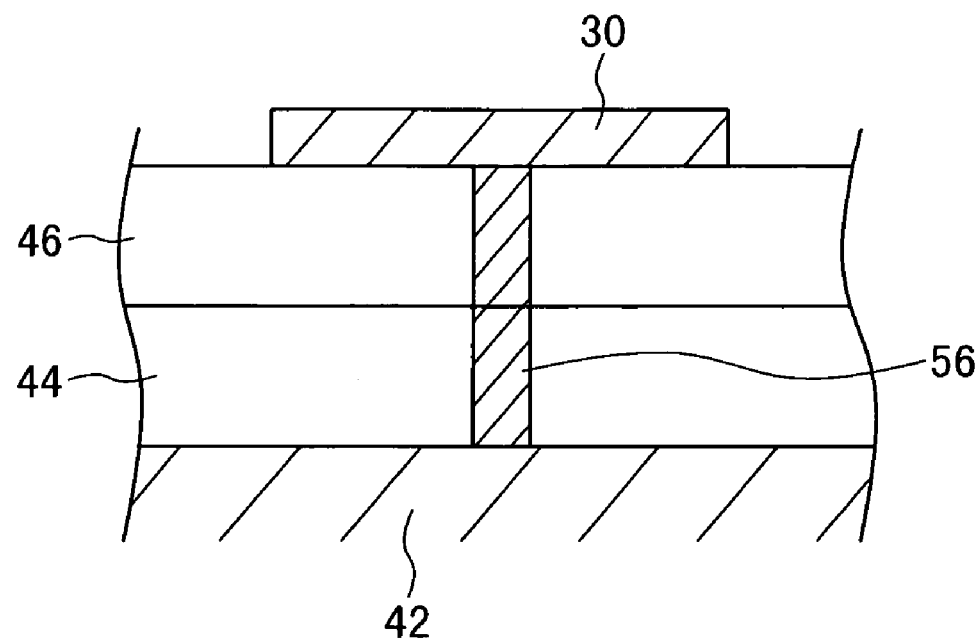
FIG. 8 is a sectional view illustrating the guard ring in 7.

Referring to FIG. 8, the VSS guard ring 56 is a metal structure extending through one or both of the interlayer dielectric films 44, 46 and connected to one of the VSS lines in the core ring, in this case to VSS line 30. The VDD guard ring 58 is a similar metal structure connected to a VDD line in the core ring.

Figure 9:
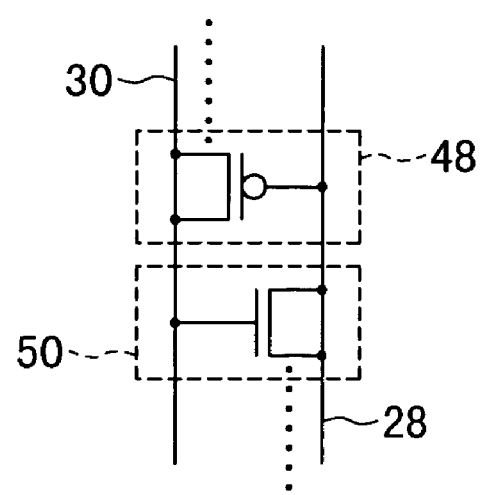
FIG. 9 is a circuit diagram of two of the MOS capacitors in FIG. 7.

The ANT_VDD MOS capacitor units 48 and ANT_VSS MOS capacitor units 50 are disposed alternately, as shown. FIG. 9 shows a schematic circuit diagram of a pair of adjacent MOS capacitor units, showing that the ANT_VDD MOS capacitor unit 48 is generally similar to a PMOS transistor and the ANT_VSS MOS capacitor unit 50 is generally similar to an NMOS transistor.

There is no particular restriction on the width of the MOS capacitor units 48, 50, but it is convenient if the same units can be used for a variety of semiconductor integrated circuits, including those with one or more embedded core arrays surrounded by separate comparatively small core rings. The width of the MOS capacitor units 48, 50 is therefore preferably small enough for accommodation in the core rings of embedded arrays. A comparatively small width also permits finer adjustment of the total amount of capacitance connected to the core ring.

Figure 10:
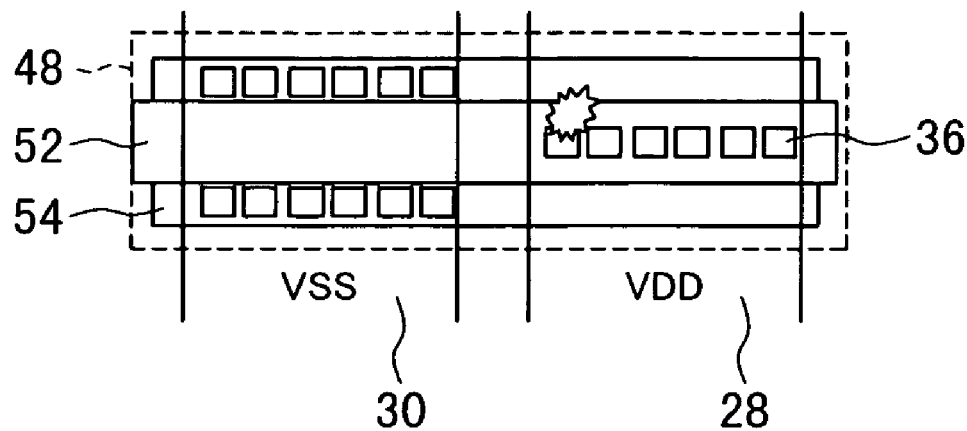
FIG. 10 is a plan view of a MOS capacitor vulnerable to damage by electrostatic discharge.
Figure 11:
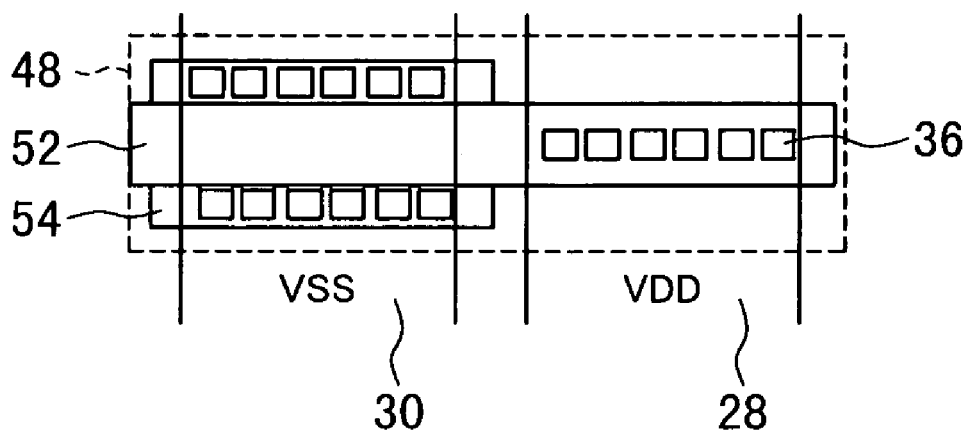
FIG. 11 is a plan view of a MOS capacitor less vulnerable to damage by electrostatic discharge.

FIGS. 10 and 11 illustrate the reason for having the active areas 54 in the MOS capacitor units 48, 50 extend for only half the width of the core ring. If the active source and drain areas extended the full width of, for example, an ANT_VDD MOS capacitor unit 48 as shown in FIG. 10, then especially if the capacitor MOS unit was disposed near one of the power cells 10 shown in FIG. 1, the direct application of the VDD potential to the polysilicon gate electrode 52 at a point above a substrate area held at the VSS potential could lead to electrostatic discharge, damaging the gate oxide film or the interlayer dielectric film. In FIG. 11, since the VDD contacts 36 are separated from the substrate area held at the VSS potential, this type of electrostatic discharge does not occur.

Figure 12:
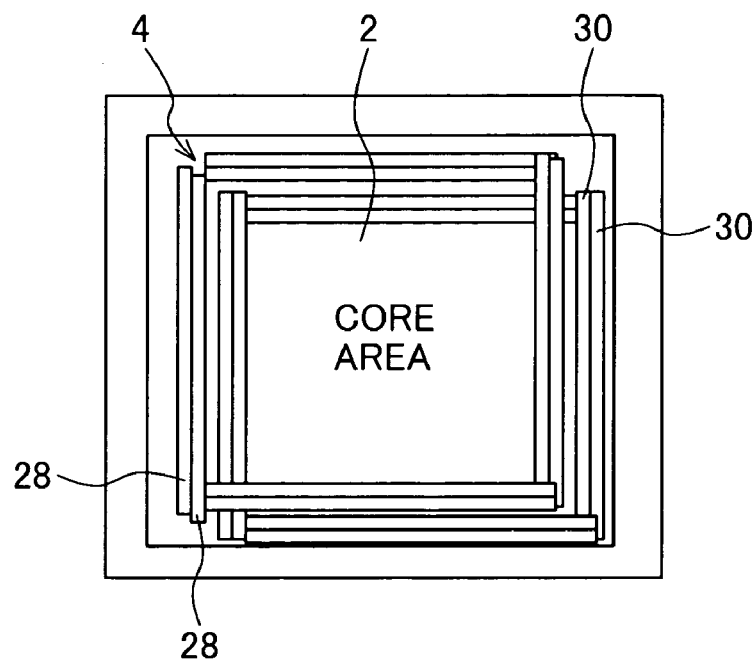
FIG. 12 is a plan view showing a core ring with two power lines and two ground lines.
Figure 13:
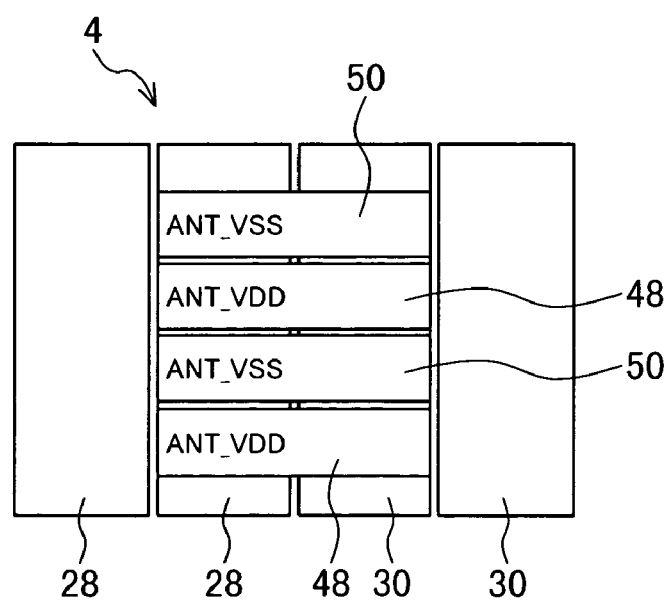
FIG. 13 illustrates the layout of MOS capacitors below the core ring in FIG. 12.

Referring to FIG. 12, the core ring 4 may include a pair of mutually adjacent VDD lines 28 and a pair of mutually adjacent VSS lines 30 on each side of the core area 2. FIG. 13 illustrates the placement of MOS capacitor units 48, 50 under the core ring lines in the second metal layer in this case. The MOS capacitor units 48, 50 need only span the mutually adjacent VDD line 28 and VSS line 30 near the center of the core ring 4, since these inner lines 28, 30 are connected to the outer VDD line 28 and VSS line 30 at the corners of the core ring 4. As in FIG. 7, ANT_VDD units 48 are preferably placed in positions alternating with ANT_VSS units 50.

One effect of the first embodiment is that the MOS capacitor units 48, 50 protect the transistors most in need of protection from plasma damage, these being the transistors with polysilicon gate electrodes that are connected to the power and ground patterns and therefore tend to have the highest antenna ratios.

Another effect is that the protection is obtained with no space penalty, since the MOS capacitor units 48, 50 are placed under the core ring 4, where they do not compete for space with the circuitry in the core area 2 or the I/O circuitry outside the core ring 4.

A further effect is that during normal device operation, the MOS capacitor units 48, 50 absorb variations in the power supply and ground potentials, thereby reducing ground bounce.

A still further effect is that the guard rings 56, 58 provided to protect the MOS capacitor units 48, 50 are disposed in positions where they can effectively absorb external current surges resulting from electrostatic discharge (ESD), and therefore improve the ESD robustness of the semiconductor integrated circuit.

A second embodiment of the invention will now be described with reference to the flowchart in FIG. 14. The second embodiment is a computer-aided design method for placing MOS capacitors as described in the first embodiment.

Figure 14:
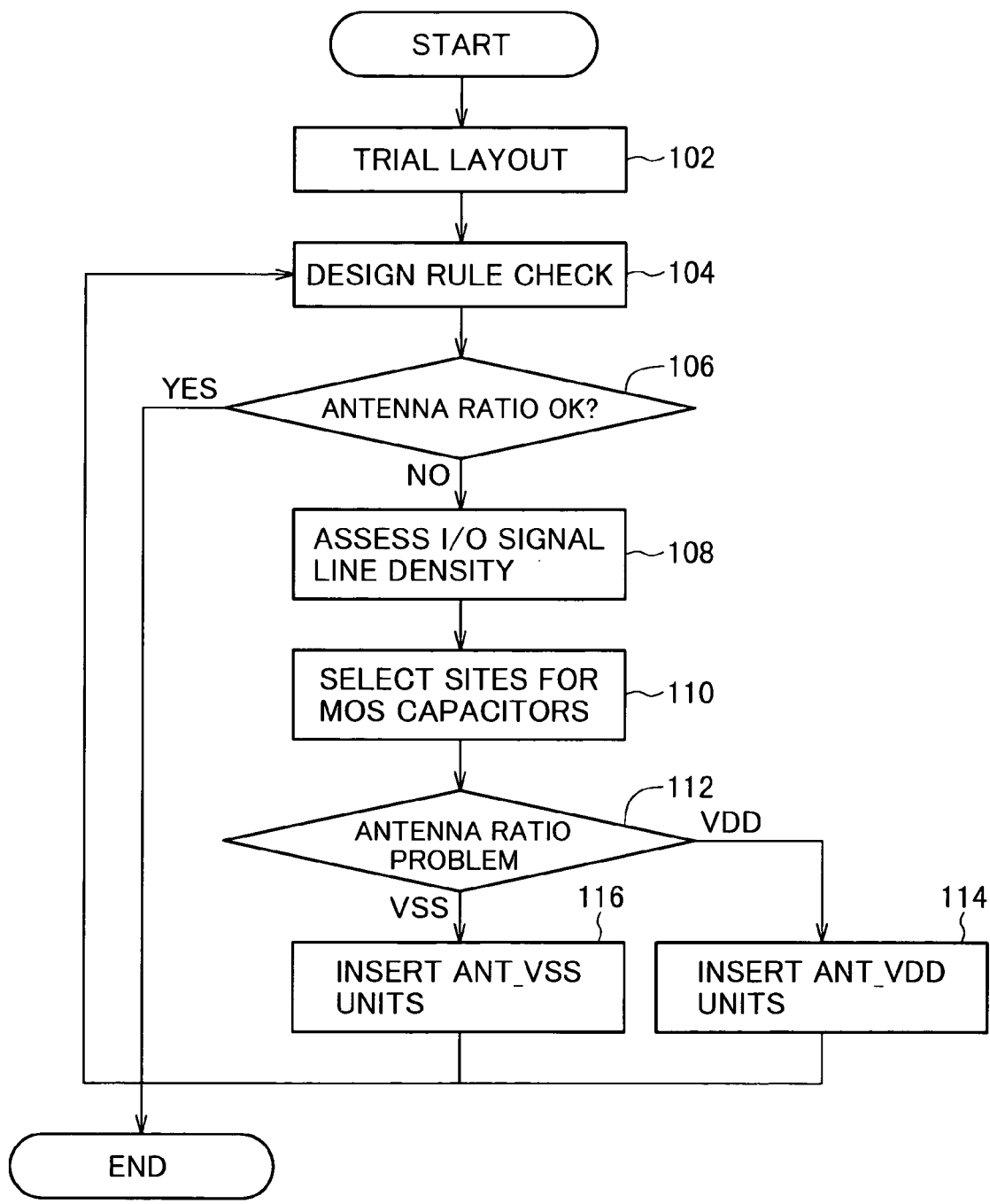
FIG. 14 is a flowchart illustrating a layout method according to a second embodiment of the invention.

In the first step 102 in FIG. 14, computer-aided design (CAD) software is used to generate a trial layout of the semiconductor integrated circuit, including all circuit elements except the MOS capacitor units. Computer-aided design techniques, also referred to as computer-assisted engineering and by various other names, are well known and will not be described in detail here.

In the next step 104, the CAD software checks the design to verify that the necessary design rules have been satisfied. One of these design rule checks is a check of the antenna ratio. Only this check will be considered in the following description.

In the next step 106, if the antenna ratio check passes, the design is considered complete and the process ends. Otherwise, processing continues as below.

In the next step 108, the CAD software assesses the density of interconnection wiring between the core area 2 and the I/O circuits 8 at different points around the core ring 4, by counting the number of I/O signal lines crossing the core ring 4 in different locations.

In the next step 110, the CAD software selects the most favorable sites for placement of MOS capacitors under the core ring 4. The selected sites are locations where the density of I/O signal lines interconnecting the core area 2 and the I/O circuits 8 is comparatively low. Locations near the core power cells 10 are not selected, due to the large number of interconnections from these cells 10 to the core ring 4.

In the next step 112, the CAD software determines whether the antenna ratio problem concerns polysilicon gate electrodes connected to the power supply (VDD) or polysilicon gate electrodes connected to ground (VSS). If the problem concerns polysilicon gate electrodes connected to VDD, then in step 114 the CAD software inserts an appropriate number of ANT_VDD units below the core ring 4. If the problem concerns polysilicon gate electrodes connected to VSS, then in step 116 the CAD software inserts an appropriate number of ANT_VSS units below the core ring 4. If the problem concerns both types of polysilicon gate electrodes, both ANT_VDD and ANT_VSS units may be inserted.

After step 114 and/or step 116, the process returns to step 104 to check the antenna ratio and other design rules again. The loop from step 104 to steps 114 and 116 is repeated until the check in step 106 passes, at which point the design is complete.

Figure 15:
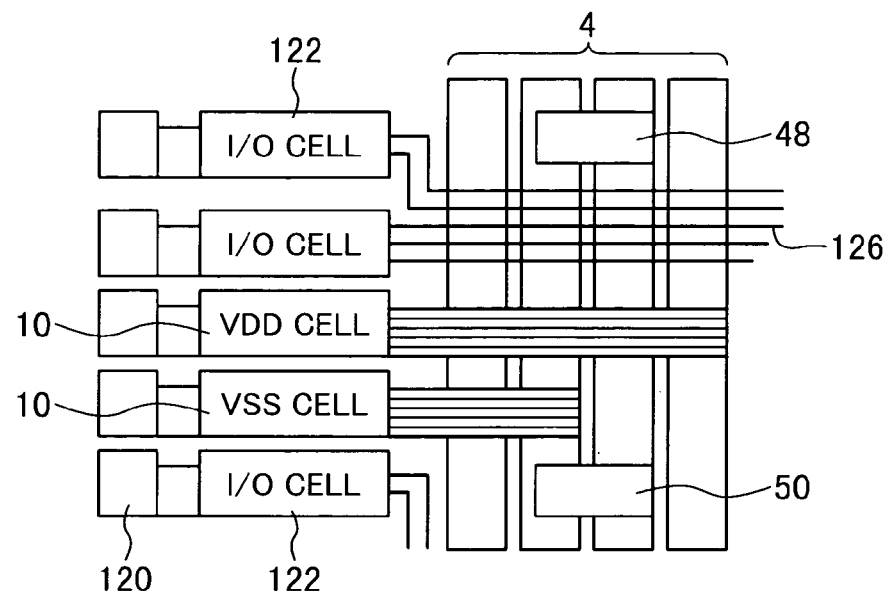
FIG. 15 is a schematic plan view of part of a semiconductor integrated circuit laid out according to the second embodiment.

FIG. 15 schematically illustrates the result of this process. The I/O circuitry 8 includes pads 120 for connection of external leads, and I/O buffers 122. Metal I/O signal lines 126 are routed from the I/O buffers 122 across the core ring 4 to circuits (not shown) in the core area. The power cells 10 include a VDD cell and a VSS cell, which are connected directly to the core ring 4. One ANT_VDD unit 48 and one ANT_VSS unit 50 have been placed under the core ring 4 in areas where the core ring 4 is not crossed by any I/O signal lines 126 and where there are no interconnections to the power cells 10.

Following the procedure in FIG. 14 ensures that the ANT_VDD and ANT_VSS units 50 are placed where they do not interfere with the layout of other circuit elements, and enables the layout of the integrated circuit to be completed without extensive revision.

Next a third embodiment of the invention will be described. The third embodiment provides both MOS capacitors of the type described in the first embodiment, and additional MOS capacitors that prevent plasma damage to protection transistors in I/O circuits.

Figure 16:
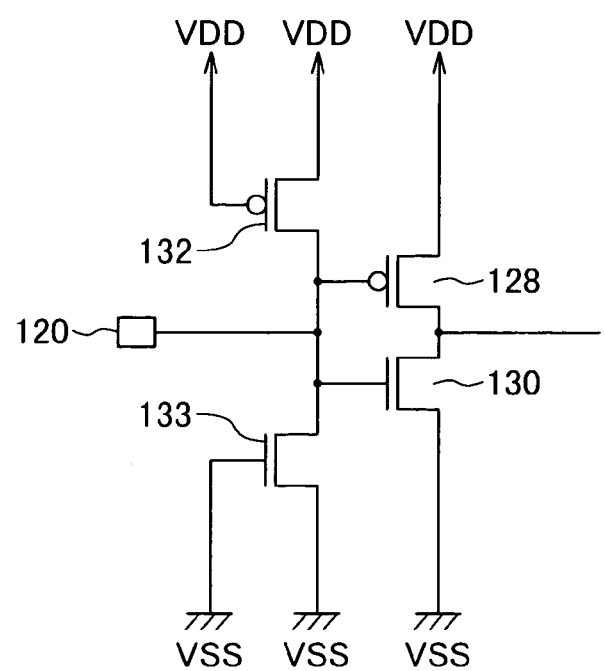
FIG. 16 is a circuit diagram of an I/O buffer with protection transistors.

FIG. 16 illustrates the protection transistors in a simple type of input buffer. The input pad 120 is connected to the gate electrodes of a PMOS switching transistor 128 and an NMOS transistor switching 130 forming an inverter. A PMOS protection transistor 132 has its source and gate electrodes connected to the power supply (VDD) and its drain electrode connected to the gate electrode of PMOS switching transistor 128. An NMOS protection transistor 133 has its source and gate electrodes connected to ground (VSS) and its drain electrode connected to the gate electrode of NMOS switching transistor 130. The protection transistors 132, 134 normally have zero gate-source voltage and are therefore switched off. If the voltage at the pad 120 goes outside the range between VSS and VDD by more than the transistor threshold voltage, due to a momentary ESD surge, for example, one of the protection transistors switches on, allowing the surge current to escape to the power supply or ground without damaging the switching transistors 128, 130 in the inverter.

Similar protection transistors are used in output buffers and input/output buffers.

Figure 17:
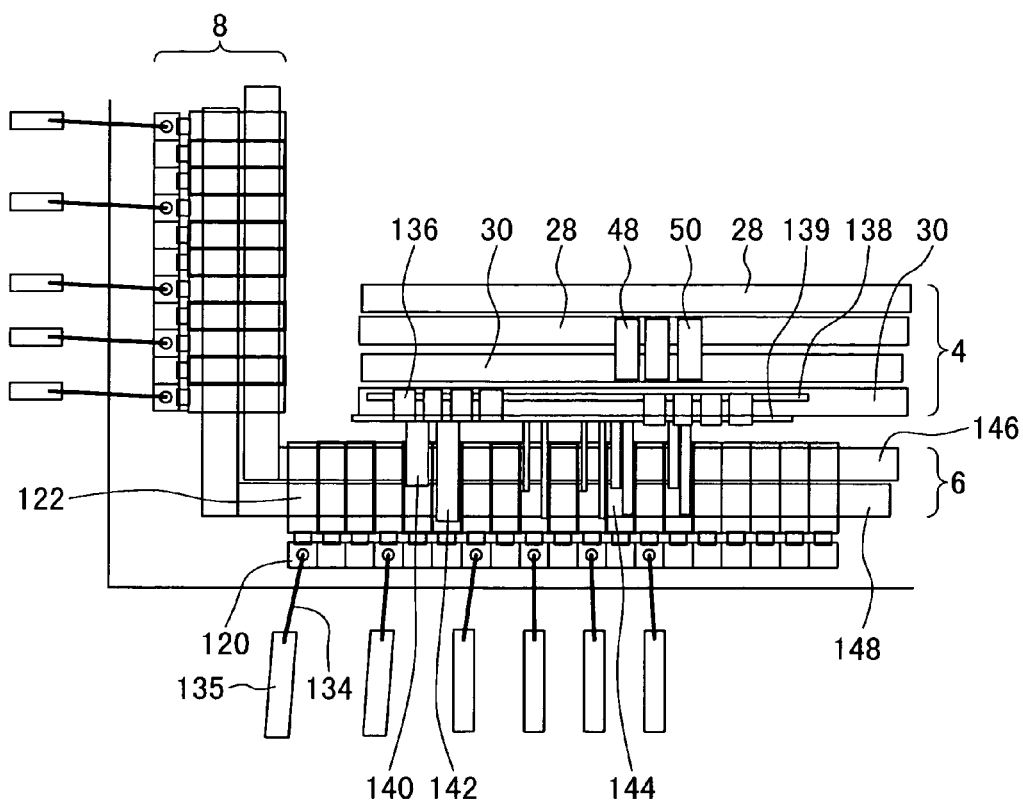
FIG. 17 is a plan view of part of an integrated circuit with MOS capacitors laid out according to a third embodiment of the invention.

FIG. 17 shows an enlarged view of part of the core ring 4, I/O ring 6, and I/O circuits 8. The I/O buffers 122 are disposed generally below the I/O ring 6, from which they are powered. The pads 120 are connected by bonding wires 134 to the external leads 135. ANT_VDD and ANT_VSS units 48, 50 are disposed beneath the inner VDD line 28 and inner VSS line 30 of the core ring 4 as in the first embodiment. Additional ANT_VDD and ANT_VSS units 136 are disposed beneath the outer line (a VSS line 30 in this case) in the core ring 4. These additional ANT_VDD and ANT_VSS units 136 are generally similar in structure to the ANT_VDD and ANT_VSS units described in the first embodiment, comprising MOS capacitors, but they are connected via shared interconnecting lines 138, 139 and interconnecting cells 140, 142, 144 to the VDD line 146 and VSS line 148 in the I/O ring 6.

Figure 18:
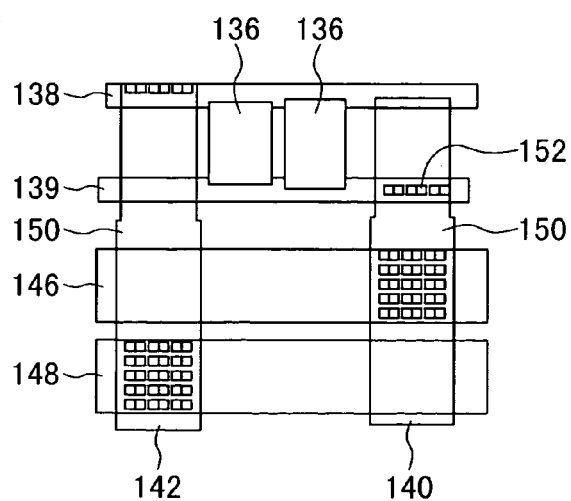
FIGS. 18 and 19 are more detailed plan views illustrating interconnecting cells in FIG. 17.
Figure 19:
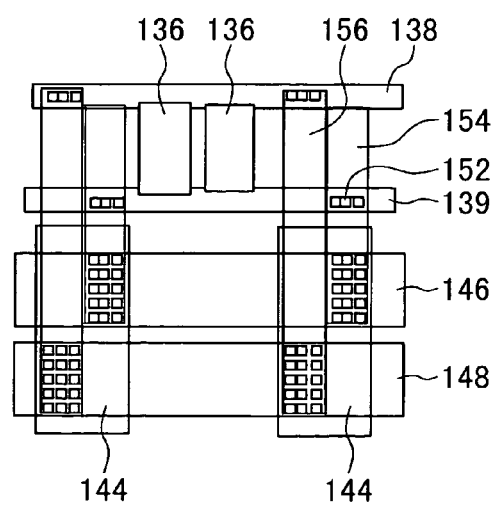

As shown in FIG. 18, a first type of interconnecting cell 140 comprises a metal interconnecting line 150 connected by contacts to VDD line 146 in the I/O ring 6 and the shared VDD interconnecting line 139. A second type of interconnecting cell 142 has a similar structure, but the contacts 152 connect the metal interconnecting line 150 to VSS line 148 in the I/O ring 6 and the shared VSS interconnecting line 138. A third type of interconnecting cell 144, shown in FIG. 19, combines the functions of the first and second types, having one metal line 154 connected by contacts 152 to VDD line 146 and the shared VDD interconnecting line 139, and another metal line 156 connected by contacts 152 to VSS line 148 and the shared VSS interconnecting line 138. These three types of interconnecting cells 140, 142, 144 are placed as necessary in slots not occupied by I/O buffers 122.

By increasing the capacitance connected to the VDD and VSS lines 146, 148 in the I/O ring 6, the additional ANT_VDD and ANT_VSS units 136 in the third embodiment extend the protection from plasma damage provided for transistors in the core area 2 in the first embodiment to transistors in I/O buffers 122. The additionally protected transistors include the protection transistors 132, 133 shown in FIG. 16.

The increased capacitance connected to the VDD and VSS lines 146, 148 in the I/O ring 6 also helps to reduce noise and ground bounce caused by, for example, the simultaneous switching of a plurality of output buffers. This has been verified through a simulation, the results of which are shown in FIGS. 20, 21, and 22.

Figure 20:
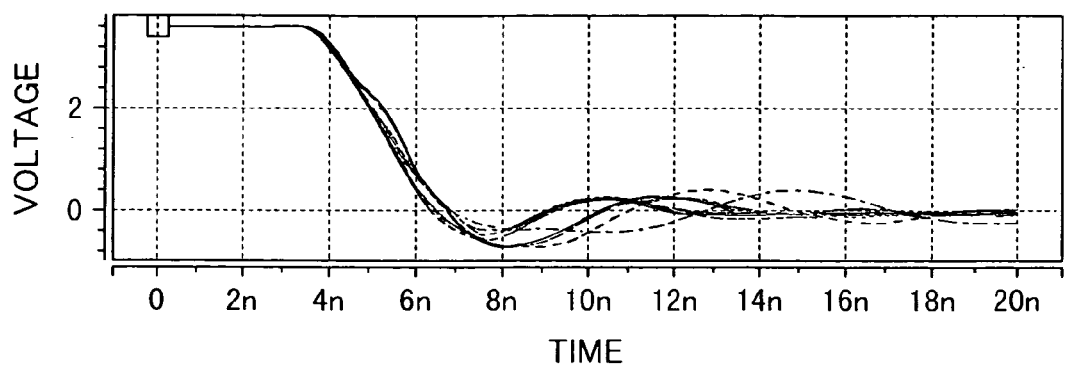
FIG. 20 is a simulated waveform diagram illustrating the simultaneous switching of a plurality output buffers.

FIG. 20 illustrates the simulated switching waveforms of a plurality output buffers that switch simultaneously from the high to the low output level. Voltage is indicated on the vertical axis and time on the horizontal axis.

Figure 21:
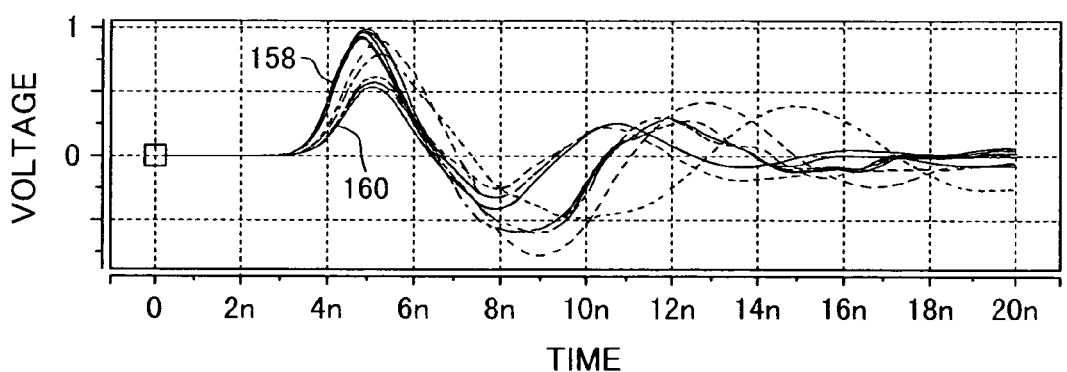
FIG. 21 is a simulated waveform diagram illustrating resulting noise in a non-switched output buffer.

FIG. 21 illustrates the resulting noise at an output buffer that is not switched. The vertical axis indicates the voltage of the output node of the buffer; the horizontal axis indicates time on the same scale as in FIG. 20. The buffer is held at the low output level, but the output voltage is perturbed by the switching shown in FIG. 20. The different waveforms in FIG. 21 illustrate simulation results with different numbers of ANT_VDD and ANT_VSS units. The most steeply rising noise waveform 158 was generated by a simulation run with no ANT_VDD and ANT_VSS units inserted. The least steeply rising noise waveform 160 was generated by the simulation run with the greatest number of ANT_VDD and ANT_VSS units inserted. The intermediate waveforms correspond to intermediate numbers of ANT_VDD and ANT_VSS units. It can be seen that as the number of ANT_VDD and ANT_VSS units increases, the amount of noise within the buffer decreases.

Figure 22:
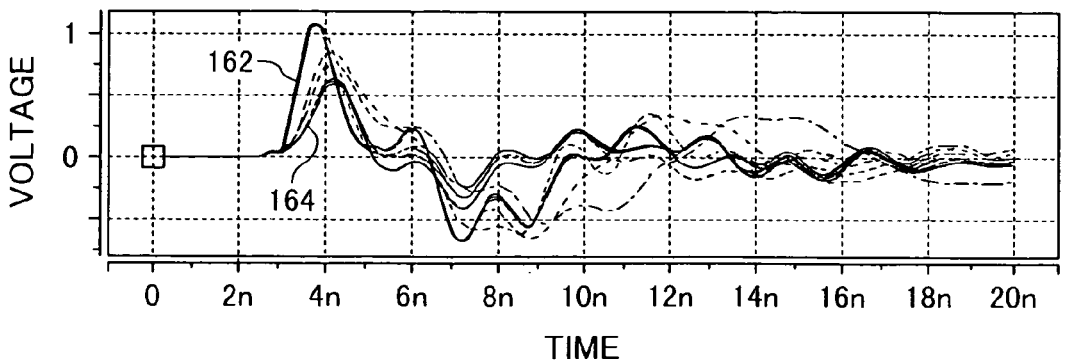
FIG. 22 is a simulated waveform diagram illustrating resulting ground bounce at a ground lead.

FIG. 22 illustrates simulated ground bounce with different numbers of ANT_VDD and ANT_VSS units. The vertical axis indicates the simulated voltage at the base of a ground lead, at a point at which the ground lead is connected by a bonding wire to the semiconductor integrated circuit; the horizontal axis indicates time on the same scale as in FIG. 20. The voltage waveforms in FIG. 22 bounce away from the ideal value of zero volts due to the effect of the simultaneous switching shown in FIG. 20. The most steeply rising noise waveform 162 was generated by a simulation run with no ANT_VDD and ANT_VSS units inserted, the least steeply rising noise waveform 164 was generated by the simulation run with the greatest number of ANT_VDD and ANT_VSS units inserted, and the intermediate waveforms correspond to intermediate numbers of ANT_VDD and ANT_VSS units. It can be seen that as the number of ANT_VDD and ANT_VSS units increases, the degree of ground bounce decreases.

In a variation of the third embodiment, the ANT_VDD and ANT_VSS units coupled to the I/O ring 6 are disposed in unused space between the I/O ring 6 and the core ring 4, instead of below the core ring 4.

A fourth embodiment of the invention provides MOS capacitors, generally as described in the first and third embodiments, for both the core ring 4 and I/O ring 6, and also provides protection transistors for protection against ESD surges on the power and ground lines. All of the MOS capacitors and protection transistors have the same layout, differing only in the location of the contacts by which they are connected to the power and ground lines.

Figure 23:
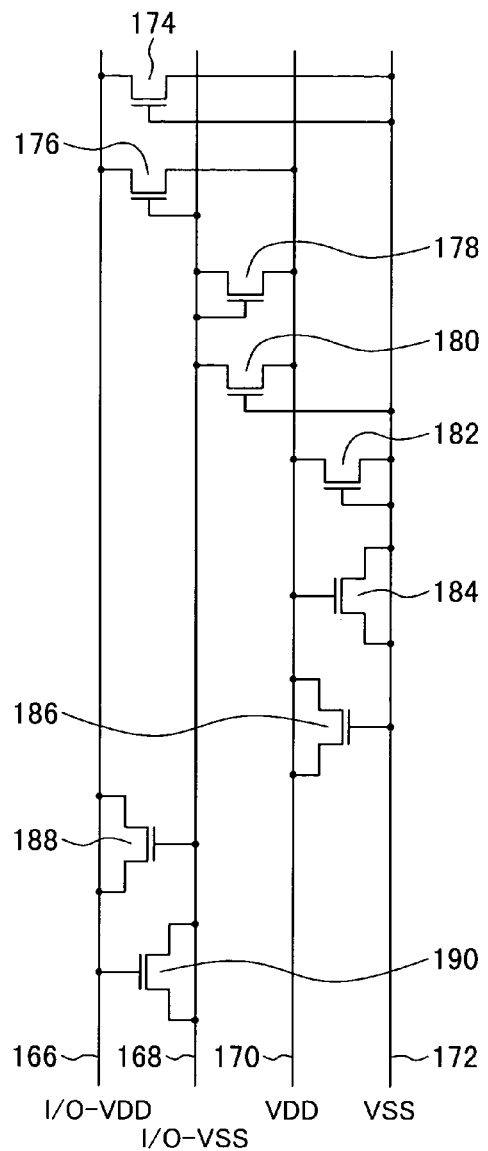
FIG. 23 is a circuit diagram illustrating protection transistors and MOS capacitors in a fourth embodiment of the invention.

FIG. 23 schematically illustrates the fourth embodiment. The I/O VDD line 166 and I/O VSS line 168 are I/O ring lines that supply power to I/O circuits; the core VDD line 170 and core VSS line 172 are core ring lines that supply power to circuits in the core of the integrated circuit.

The protection transistors are NMOS transistors 174, 176, 178, 180, and 182 that shunt ESD surge current between various pairs of VDD and VSS lines so that the surge can escape to the power supply or ground without damaging transistors in the I/O circuits or core area. Each of these protection transistors has its gate electrode connected to one of the VSS lines 168, 172 and is therefore normally switched off. The protection transistor switches on when the voltage on a VSS line 168 or 172 is abnormally high or the voltage on a VDD line 166 or 170 is abnormally low. As can be seen from FIG. 23, NMOS transistor 174 shunts ESD surge current between the I/O VDD line 166 and core VSS line 172; NMOS transistor 176 shunts ESD surge current between the I/O VDD line 166 and core VDD line 170; NMOS transistors 178 and 180 shunt ESD surge current between the I/O VSS line 168 and core VDD line 170; and NMOS transistor 182 shunts ESD surge current between the core VDD line 170 and core VSS line 172.

MOS capacitors 184, 186, 188, and 190 provide protection from plasma damage as described in the first and third embodiments. MOS capacitor 184 is a core ANT_VDD unit, protecting transistors having gate electrodes coupled to the VDD line 170 in the core ring. MOS capacitor 186 is a core ANT_VSS unit, protecting transistors having gate electrodes coupled to the VSS line 172 in the core ring. MOS capacitor 188 is an I/O ANT_VSS unit, protecting transistors having gate electrodes coupled to the VSS line 168 in the I/O ring. MOS capacitor 190 is an I/O ANT_VDD unit, protecting transistors having gate electrodes coupled to the VDD line 166 in the I/O ring.

Figure 24:
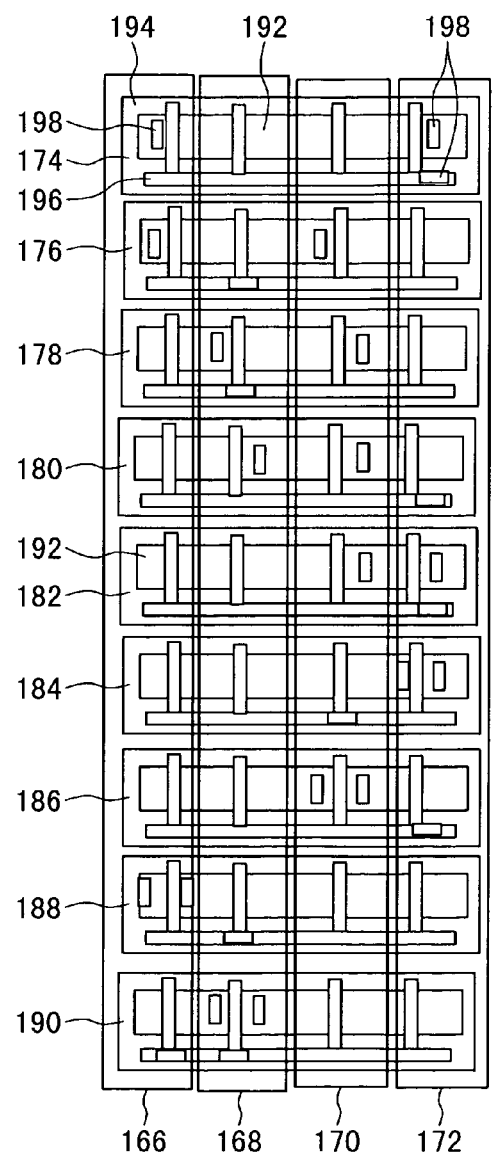
FIG. 24 is plan view of MOS units laid out according to the fourth embodiment.

FIG. 24 illustrates the layout of the protection transistors 174, 176, 178, 180, 182 and MOS capacitors 184, 186, 188, 190. Each protection transistor or MOS capacitor is formed in a cell comprising an active region 192 surrounded by a field oxide 194. Each cell has a polysilicon gate electrode 196 with branches crossing the active region 192 below the VDD lines 166, 170 and VSS lines 168, 172 in the core ring and I/O ring. Contacts 198 connect the active region 192 and polysilicon gate electrode 196 to the appropriate VDD lines 166, 170 and VSS lines 168, 172.

Both the protection transistors and MOS capacitors in the fourth embodiment have the effect of increasing the total polysilicon gate electrode area connected to the VDD and VSS lines in the core ring and I/O ring, thereby reducing the antenna ratio and protecting the integrated circuit from plasma damage in the fabrication process. The protection transistors 174, 176, 178, 180, 182 protect core and I/O transistors having gate electrodes connected to the VSS lines 168, 172. The MOS capacitors 184, 186, 188, 190 protect core and I/O transistors having gate electrodes connected to either the VDD lines 166, 170 or the VSS lines 168, 172. The protection transistors 174, 176, 178, 180, 182 also help protect the completed integrated circuit from electrostatic discharge.

Figure 25:
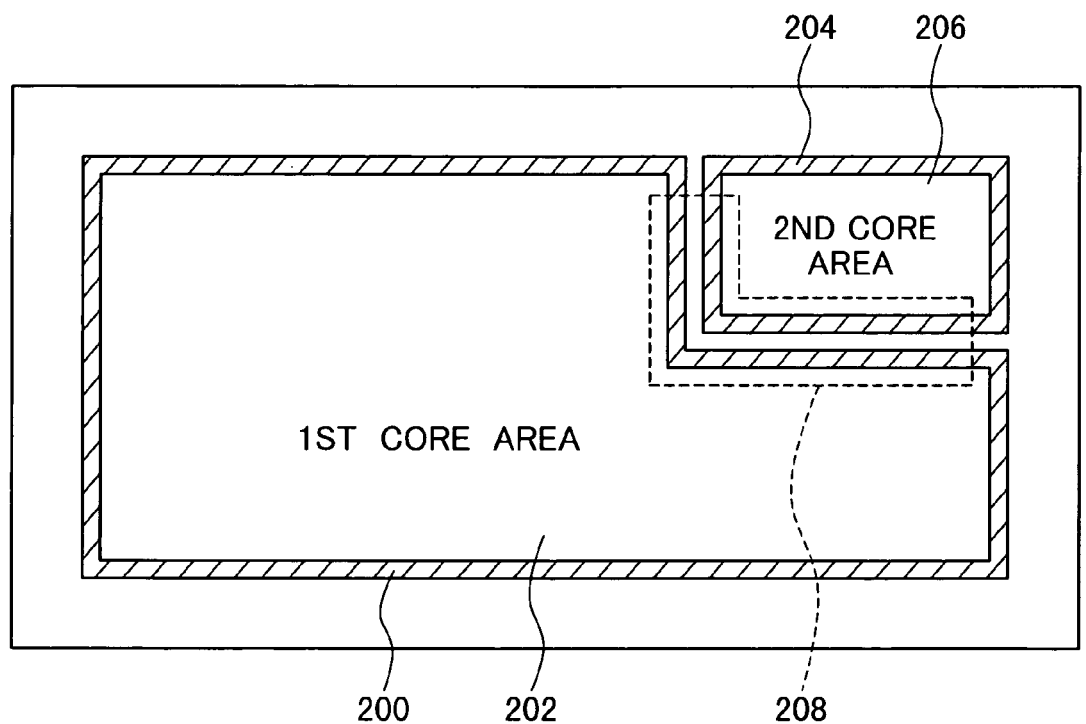
FIG. 25 is a plan view of an integrated circuit with two core rings.

The scheme illustrated in the fourth embodiment is not limited to use with an I/O ring and core ring. In an integrated circuit having two separate cores, for example, each core being surrounded by its own core ring, the layout shown in FIG. 24 can be used where the two core rings are adjacent, the protection transistors shunting current from one core ring to the other core ring. In FIG. 25, for example, a first core ring 200 supplies power to a first core area 202 comprising circuits that operate at a supply voltage of 2.5 V, and a second core ring 204 supplies power to a second core area 206 comprising circuits that operate at a supply voltage of 1.8 V. Protection transistors and MOS capacitors with the cell layout shown in FIG. 24 are provided in the region 208 where the two core rings are adjacent. The protection transistors may shunt ESD surge shunt current between the two core rings 200 and 204. Additional MOS capacitors may be provided under the individual core rings 200, 204 as necessary.

Figure 26:
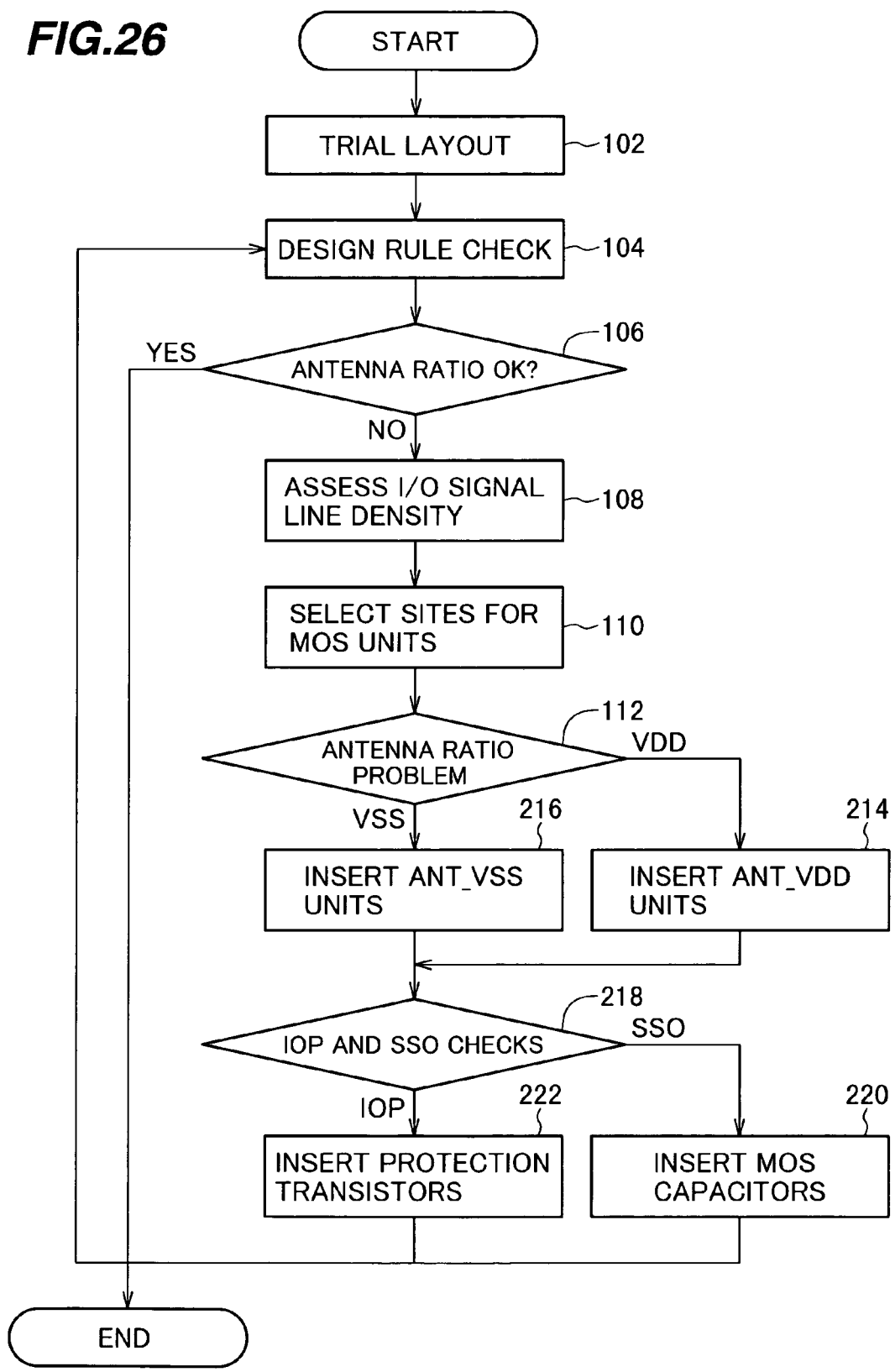
FIG. 26 is a flowchart illustrating a layout method according to a fifth embodiment of the invention.

A fifth embodiment of the invention will now be described with reference to the flowchart in FIG. 26. The fifth embodiment is a computer-aided design method for placing MOS capacitors and protection transistors as described in the fourth embodiment.

Steps 102, 104, 106, 108, 110, and 112 are similar to the corresponding steps in FIG. 14. As described in the second embodiment, a preliminary layout is performed and the antenna ratio is checked; if it is too high, suitable locations for inserting ANT_VDD units and ANT_VSS units are found and the type or types of units to be inserted (ANT_VDD or ANT_VSS, or both types) is determined. The sites selected in step 110 may also be used for the insertion of other types of MOS units in the following steps.

In steps 214 and 216, ANT_VDD units and ANT_VSS units are inserted as determined in step 112. These units have the layout of MOS units 184 and 186 in FIGS. 23 and 24, with their active regions and polysilicon gate electrodes both connected to the core ring.

After steps 214 and 216, in step 218 the number of I/O protection transistors (IOP) is counted and the number of simultaneously switched output buffers (SSO) is also counted. If the number of I/O protection transistors is inadequate, a decision is made to insert protection transistors, which are connected to both the I/O ring and the core ring. If the number of simultaneously switched output buffers is large enough to cause significant ground bounce, a decision is made to insert MOS capacitors connected to the I/O ring.

In step 220, MOS capacitors similar to one or both of capacitors 188 and 190 in FIGS. 23 and 24 are inserted into the layout.

In step 222, NMOS protection transistors similar to any of transistors 174, 176, 178, and 180 in FIGS. 23 and 24 are inserted into the layout. Either or both of steps 220 and 222 may be performed, as necessary. If neither step 220 nor step 222 is necessary, both steps are skipped. Next, the processing returns to step 104 to check the antenna ratio again, and the subsequent steps are repeated if the antenna ratio is still too high. Repetition of step 104 and the subsequent steps continues until an acceptable antenna ratio is achieved.

Like the second embodiment, the fifth embodiment provides a way to insert MOS capacitors for protection from plasma damage without disrupting the layout or increasing the size of the semiconductor integrated circuit. In addition, the fifth embodiment identifies possible sources of noise and reliability problems in the semiconductor integrated circuit, and adds further MOS capacitors or protection as necessary to avoid these problems, again without disrupting the layout. An integrated circuit with improved protection from plasma damage, from noise due to simultaneous switching of output buffers, and from ESD surges can therefore be designed with a minimum of revision of the trial layout.

The layout procedure shown in the fifth embodiment can be completely programmed into CAD software. Alternatively, the procedure can be partly programmed and partly performed by manual operations with a pointing device such as a mouse on menus and other displays provided by the CAD software to enable the designer to exercise a greater degree of control over the layout process.

A few variations of the preceding embodiments have been mentioned above, but those skilled in the art will recognize that further variations are possible within the scope of the invention, which is defined in the appended claims.

What is claimed is:

1. A method of laying out an integrated circuit having a semiconductor substrate and metal interconnecting lines disposed above the semiconductor substrate, the metal interconnecting lines including a core ring with a first power line and a first around line, the first power line and the first ground line being mutually adjacent, core ring supplying power to circuits surrounded by the core ring, the method comprising:

routing a plurality of the metal interconnecting lines across the core ring, for use as input-output (I/O) signal lines;

identifying a part of the core ring crossed by comparatively few of the I/O signal lines;

laying out at least one metal-oxide-semiconductor (MOS) capacitor unit below said part of the core ring, the MOS capacitor unit having an active area disposed in the semiconductor substrate and an insulated gate electrode disposed on the semiconductor substrate, at least part of the insulated gate electrode being disposed above part of the active area;

laying out first contacts connecting the active area to one of the first power line and the first ground line, and;

laying out second contacts connecting the insulated gate electrode to another one of the first power line and the first around line.

2. A method of laying out an integrated circuit having a semiconductor substrate and metal interconnecting lines disposed above the semiconductor substrate, the metal interconnecting lines including a core ring with a first power line and a first around line, the first power line and the first ground line being mutually adjacent, the core ring supplying power to circuits surrounded by the core ring, the method comprising:

calculating an antenna ratio of the first power line;

calculating an antenna ratio of the first ground line;

laying out at least one metal-oxide-semiconductor (MOS) capacitor unit below the core ring, the MOS capacitor unit having an active area disposed in the semiconductor substrate and an insulated gate electrode disposed on the semiconductor substrate, at least part of the insulated gate electrode being disposed above part of the active area;

laying out first contacts connecting the active area to one of the first power line and the first ground line, and;

laying out second contacts connecting the insulated gate electrode to another one of the first power line and the first ground line;

wherein laying out said second contacts includes connecting the insulated gate electrode to the first power line if the antenna ratio of the first power line is greater than the antenna ratio of the first ground line; and connecting the insulated gate electrode to the first ground line if the antenna ratio of the first ground line is greater than the antenna ratio of the first power line.

3. A method of laying out an integrated circuit having a semiconductor substrate and metal interconnecting lines disposed above the semiconductor substrate, the metal interconnecting lines including a core ring with a first power line and a first ground line and an input-output (I/O) ring with a second power line and a second ground line, the first power line and the first ground line being mutually adjacent, the second power line and the second ground line being mutually adjacent, the I/O ring and the core ring being mutually adjacent, the I/O ring surrounding the core ring, the core ring supplying power to circuits surrounded by the core ring, the I/O ring supplying power to I/O circuits disposed outside the core ring, the method comprising:

routing a plurality of the metal interconnecting lines from the circuits surrounded by the core ring to the I/O circuits, for use as I/O signal lines;

identifying a part of the core ring crossed by comparatively few of the I/O signal lines;

laying out a plurality of MOS units below said part of the core ring and below the I/O ring, each MOS unit having an active area disposed in the semiconductor substrate and an insulated gate electrode disposed on the semiconductor substrate, the active area underlying the first power line, the first around line, the second power line, and the second ground line, the insulated gate electrode paralleling the active area and having a plurality of branches overlying the active area; and laying out contacts connecting the MOS units to the core ring and the I/O ring, the contacts causing at least a first one of the MOS units to function as a MOS capacitor connected to the core ring, and at least a second one of the MOS units to function as a protection transistor connected to both the core ring and the I/O ring.

4. A method of laying out an integrated circuit having a semiconductor substrate and metal interconnecting lines disposed above the semiconductor substrate, the metal interconnecting lines including a core ring with a first power line and a first ground line and an input-output (I/O) ring with a second power line and a second ground line, the first power line and the first ground line being mutually adjacent, the second power line and the second around line being mutually adjacent, the I/O ring and the core ring being mutually adjacent, the I/O ring surrounding the core ring, the core ring supplying power to circuits surrounded by the core ring, the I/O ring supplying power to I/O circuits disposed outside the core ring, the method comprising:

laying out a plurality of MOS units below the core ring and the I/O ring, each MOS unit having an active area disposed in the semiconductor substrate and an insulated electrode disposed on the semiconductor substrate, the active area underlying the first power line, the first ground line, the second power line, and the second ground line, the insulated gate electrode paralleling the active area and having a plurality of branches overlying the active area;

calculating an antenna ratio of the first power line;

calculating an antenna ratio of the first ground line; and laying out contacts connecting the MOS units to the core ring and the I/O ring, the contacts causing at least a first one of the MOS units to function as a MOS capacitor connected to the core ring, and at least a second one of the MOS units to function as a protection transistor connected to both the core ring and the I/O ring;

wherein if the antenna ratio of the first power line is greater than the antenna ratio of the first ground line, the contacts connect the insulated gate electrode of the first MOS unit to the first power line and connect the active area of the first one of the MOS units to the first ground line; and if the antenna ratio of the first ground line is greater than the antenna ratio of the first power line, the contacts connect the insulated gate electrode of the first one of the MOS units to the first ground line and connect the active area of the first MOS unit to the first power line.

* * * * *